(12) United States Patent
Bogel

(10) Patent No.: US 7,669,814 B2
(45) Date of Patent: Mar. 2, 2010

(54) STAND WITH AT LEAST THREE LEGS

(75) Inventor: Gerhard Bogel, Balgach (CH)

(73) Assignee: Leica Geosystems AG, Heerbrugg (CH)

( * ) Notice: Subject to any disclaimer, the term of this patent is extended or adjusted under 35 U.S.C. 154(b) by 85 days.

(21) Appl. No.: 12/030,290

(22) Filed: Feb. 13, 2008

(65) Prior Publication Data

US 2008/0191105 A1   Aug. 14, 2008

(30) Foreign Application Priority Data

Feb. 13, 2007   (DE)   ................ 10 2007 007 041

(51) Int. Cl.
*F16M 11/32* (2006.01)
(52) U.S. Cl. ............... 248/163.1; 248/166; 248/170; 248/188.7; 248/519; 248/528
(58) Field of Classification Search ............ 248/163.1, 248/170, 166
See application file for complete search history.

(56) References Cited

U.S. PATENT DOCUMENTS

| | | | | |
|---|---|---|---|---|
| 30,069 A | * | 9/1860 | Lamb | .............. 211/167 |
| 1,424,271 A | * | 8/1922 | Anderson | .............. 248/170 |
| 2,589,520 A | * | 3/1952 | Hermanni | .............. 248/177.1 |
| 5,541,727 A | | 7/1996 | Rando et al. | |
| 5,584,458 A | | 12/1996 | Rando | |
| 6,491,266 B1 | * | 12/2002 | Chen | .............. 248/163.1 |
| 2004/0129843 A1 | * | 7/2004 | Pernstich et al. | .......... 248/163.1 |
| 2007/0090235 A1 | * | 4/2007 | Ziemkowski et al. | ..... 248/163.1 |
| 2008/0191105 A1 | * | 8/2008 | Bogel | .............. 248/170 |
| 2008/0224000 A1 | * | 9/2008 | Yang | .............. 248/188.5 |

FOREIGN PATENT DOCUMENTS

| | | |
|---|---|---|
| DE | 20202354 U1 | 4/2002 |
| EP | 0258646 A2 | 3/1988 |
| EP | 1108981 A2 | 6/2001 |
| WO | 2006022896 A2 | 3/2006 |

* cited by examiner

*Primary Examiner*—J. Allen Shriver, II
*Assistant Examiner*—Alaeddin Mohseni
(74) *Attorney, Agent, or Firm*—Workman Nydegger

(57) ABSTRACT

A stand with at least three stand legs (2, 3, 4), which is embodied to fasten a leveling, plumbing, or angular calibration device (5), is provided, with the stand legs (2, 3, 4) being embodied rotational around a common axis (6) at their ends facing each other. Each stand leg (2, 3, 4) is bent by the same angle ($\alpha$) at a distance from the axis (6), with a freely projecting section (14) of one leg being provided with a threaded bolt (15) freely protruding transversely thereto.

19 Claims, 3 Drawing Sheets

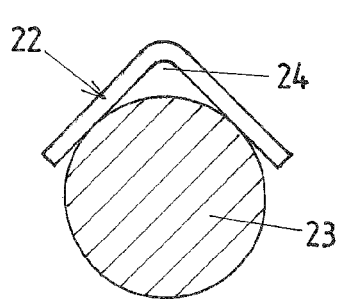
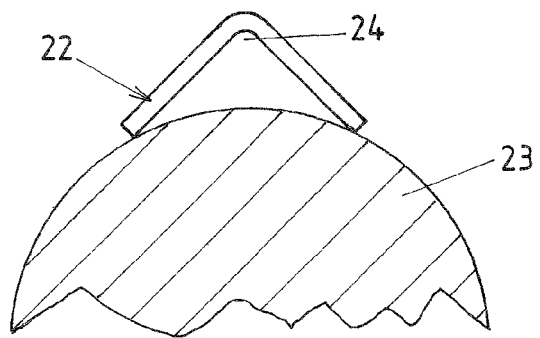
Fig. 8   Fig. 7
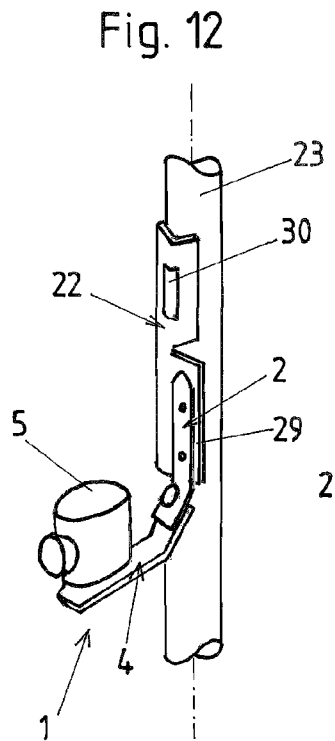
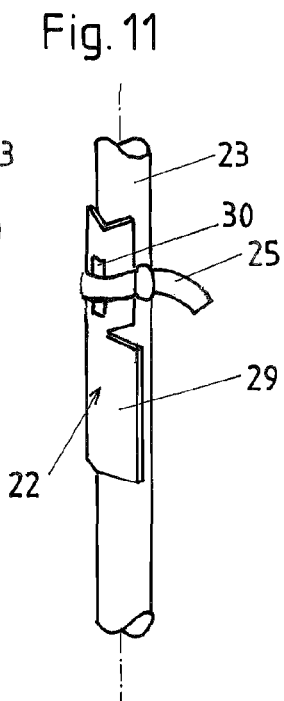
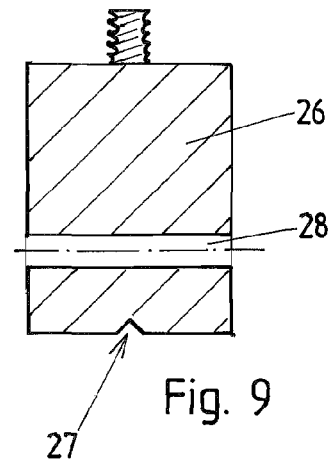
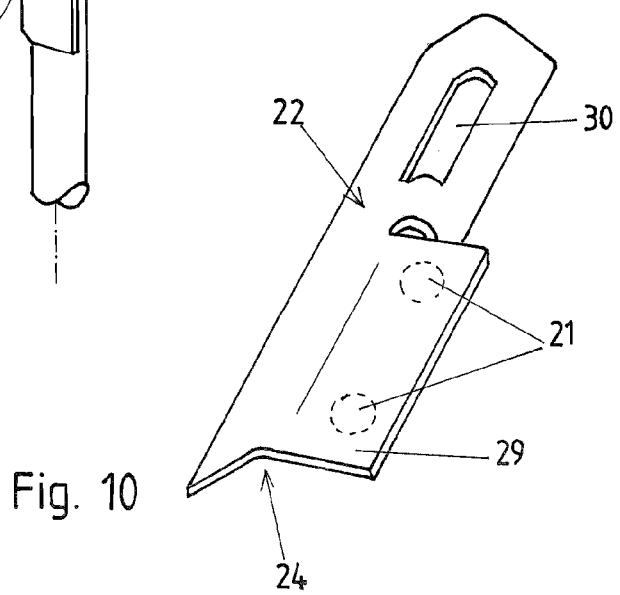
Fig. 12   Fig. 11   Fig. 9
Fig. 10

STAND WITH AT LEAST THREE LEGS

CROSS-REFERENCE TO RELATED APPLICATIONS

This application claims the benefit of DE 10 2007 007 041.3, filed Feb. 13, 2007, which is incorporated herein as if fully set forth.

BACKGROUND OF THE INVENTION

The invention relates to a stand with at least three stand legs, which is embodied for holding a leveling, plumbing, or angular calibration instrument, e.g., a linear laser, point laser, or small rotary laser device, with the stand legs at their ends facing each other being rotational around a common axis, and each of the stand legs being bent by the same angle at a distance from the axis.

A number of accessories are offered for linear lasers. They are always designed to support the linear laser in reference to a desired operational position. Linear lasers are provided with a photo thread, for example. This way, the user can insert very small or normally sized photo tripods, which usually are provided with a central column, which is adjustable via a crank (vertical fine-adjustment of the linear laser). Another principle is based on telescopic columns, vertically stretched between the floor and the ceiling. In this way, any arbitrary vertical position can be adjusted for the placement of a laser in a room.

Fastening devices for point and linear lasers are also known, which operate by tying them to tubes, fastening via magnets or by directly screwing them to the wall. Block-type fastening means are also known, which can be converted into a tripod by foot elements that can be folded out around a horizontal axis.

Additional holders for leveling, plumbing, and angular calibration instruments are also known from WO2006/022896A2, EP1108981A2, U.S. Pat. Nos. 5,541,727A, and 5,584,458A. However, in all embodiments some preliminary assembly processes are necessary and the structural parts are large and expensive.

DE 20 202 354 199 shows a stand of the type mentioned at the outset having three stand legs rotational around a common axis. The stand legs are swiveled apart in the generic prior art such that a tripod develops, so that the stand securely rests with its legs on the ground and that the instruments to be placed onto the stand are held securely.

SUMMARY OF THE INVENTION

The invention provides a generic stand such that it can be used as a wall mount for a leveling, plumbing, and angular calibration instrument.

According to the invention, the lowermost stand leg is provided with a threaded bolt, freely protruding transversely from a freely projecting section.

The threaded bolt at the freely projecting section of the lowermost stand leg can therefore be suitable and/or provided for holding the leveling, plumbing, and angular calibration instrument. When the stand, as common in prior art, is provided with a threaded bolt arranged at the common axis of the stand legs for holding the leveling, plumbing, and angular calibration instrument, the threaded bolt according to the invention at the freely projecting section of the lowermost legs represents another and/or an additional threaded bolt. Preferably all stand legs are bent at a bend with the same angle each, with each stand leg being provided with a section between the common axis and the bend and with a section freely projecting at the side of the bend opposite said section.

Due to this possibility to swivel the stand legs it is achieved that a stand can practically be collapsed to the size of three legs formed from flat parts and that the stand can be erected ready for use by a simple pivotal motion into positions offset in reference to each other by approx. 120° each. This is an optimal embodiment particularly for a universally used small stand. Therefore, such a stand could be easily produced form plastic injection-molded parts. The stand can then also be erected securely on rough and uneven surfaces.

In order to improve the stability of the stand on the floor it is suggested for the stand legs to be provided with lateral limits, which at least converge towards each other in the proximity of the freely projecting supporting ends of the stand legs. Therefore, these ends are formed as a tip or at least as a rounded tip.

In order to allow the instruments or devices to be duly fastened at this stand, when said stand is resting on its stand legs, it is provided that a threaded bolt, which protrudes in the common axis beyond the uppermost stand leg, is effectively connected to an operational disc arranged below the lowermost leg. Thus, instruments or devices of any kind can be fastened, similar to photo equipment.

Further, it is suggested that the stand legs are arranged at a slight distance from each other, at least in the area of the common axis. This way it is possible to produce the stand legs from a flat profile, because this allows in a simple manner a mutual pivoting around a common axis due to this distance.

In this context it is also advantageous when the stand legs are arranged at a slight distance from each other over their entire length when swiveled together. The stand legs are therefore never in the way of each other during the swiveling process, i.e. when the legs are pivoted into the supporting position and also when swiveled together.

In order to provide compensation to the various vertical positions of the stand legs connected to the common axis and to achieve that the common axis during the use of the stand on the ground extends practically in a vertical direction right from the start it is provided that the two sections of the stand legs created by the bend have a different length at each leg.

Here, an advantageous design comprises that the two sections formed by the bend of the uppermost stand leg are embodied the longest and that these sections of the lowermost stand leg are embodied the shortest. This way, the legs do not disturb each other during any swiveling process and additionally an exactly aligned positioning on the ground is possible at all times.

A particular embodiment provides that the two sections of the stand legs form an angle of 135° in reference to each other. This particular selection of the angle is particularly beneficial to use the stand as a wall mount and a support for an instrument or a device. Then, one stand leg is pivoted in reference to the other stand leg by 180° around the common axis and serves to mount the stand to a wall or a similarly vertically aligned fastening. The other stand legs swiveled by 180° in reference thereto are then aligned such that the freely projecting sections of the stand legs form an angle of 90° in reference to each other. The instrument or device can then be practically positioned aligned in the appropriate position.

In this context, as stated at the outset, it is provided that the lowermost stand leg is provided with another threaded bolt, preferably protruding transversely from the freely projecting section. Therefore, when the stand is used at a wall or the like, the instrument or device can be mounted in a similar fashion.

In order to allow the stand to be advantageously used at a wall or with another support, it is provided that at least one of the stand legs, preferably the uppermost stand leg, is provided with recesses, slots, bores, or the like in the freely projecting section. This way, in a simple manner, a hooking in or fastening by another fastening means can occur.

Another embodiment provides for at least one of the stand legs, preferably the uppermost stand leg, to carry at least one permanent magnet, arranged preferably inserted into the surface of the stand leg at the freely projecting section. Using such an embodiment it is also possible to allow the fastening of the stand at a wall or a carrier made from metal, without requiring any additional fastening means.

Particularly for a wall fastening using screws with a head, it is advantageous when at least one of the stand legs, preferably the uppermost stand leg, is provided with keyhole-type recesses at the freely projecting section. The stand and/or the respective stand leg can be hooked to a wall after a screw was mounted.

Within the scope of the invention it is also possible to provide additional means in order to fasten the stand, e.g., to a tubular support. One possibility considered is the arrangement of an adapter to be inserted between a tubular support and a stand leg, with the adapter being provided with groove-like recesses for a securely positioning contact to the tubular support. In this way, such an adapter can be mounted to the tubular support in a fixed manner and without any risk of deviations. This also allows an optimally aligned fastening for the stand.

In this context it is possible to fasten the adapter to a tubular support via a fastening tape or a tensile tape. This creates a secure mechanical connection.

Another way of fastening a stand according to the invention to a wall or the like is given when a double-sided adhesive tape is provided for connecting a stand leg to a level wall. This way, an optimal and secure fastening or placement is possible for any application of the stand according to the invention.

BRIEF DESCRIPTION OF THE DRAWINGS

In the following description additional features and particular advantages of the invention are explained in greater detail using the drawings. In the drawings:

FIGS. 7-9 are views of an adapter for a connection to a tubular support;

FIG. 10 is a perspective view of the adapter;

FIG. 11 is a view of one possible fastening of an adapter to a tubular support;

FIG. 12 is a similar view to FIG. 11, however, with a mounted stand and an instrument placed on it.

DETAILED DESCRIPTION OF THE PREFERRED EMBODIMENTS

The stand 1 according to the invention includes at least three stand legs 2, 3, and 4. The stand 1 is intended to fasten a leveling, plumbing, and angular calibration instrument 5, e.g., a linear laser, point laser, or small rotary laser device. Of course, within the scope of the invention this stand can be used for other purposes as well, e.g., for fastening photo equipment, when a small stand is sufficient.

The invention provides that the stand legs with their ends facing each other are rotational around a common axis 6. Further, all stand legs 2, 3, 4 are bent by the same angle α at a distance from the axis 6.

Figure 1:
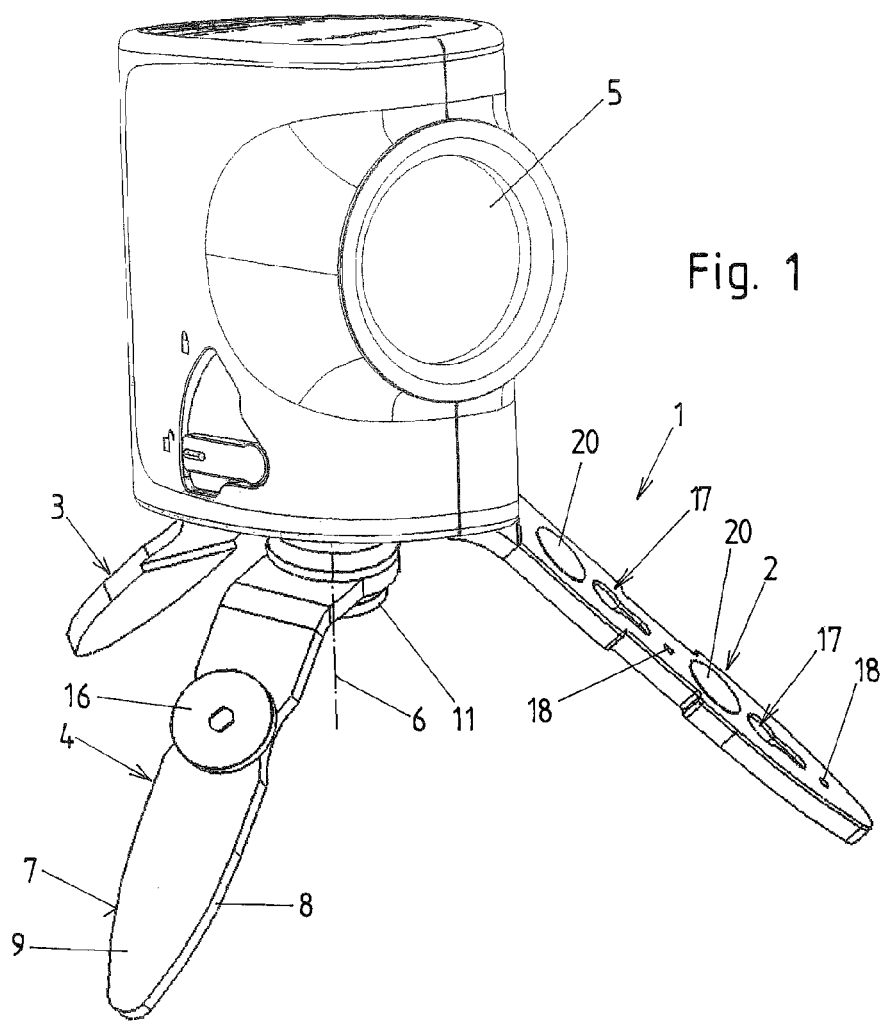
FIG. 1 is a perspective view of a stand according to the invention with an instrument placed on it.
Figure 2:
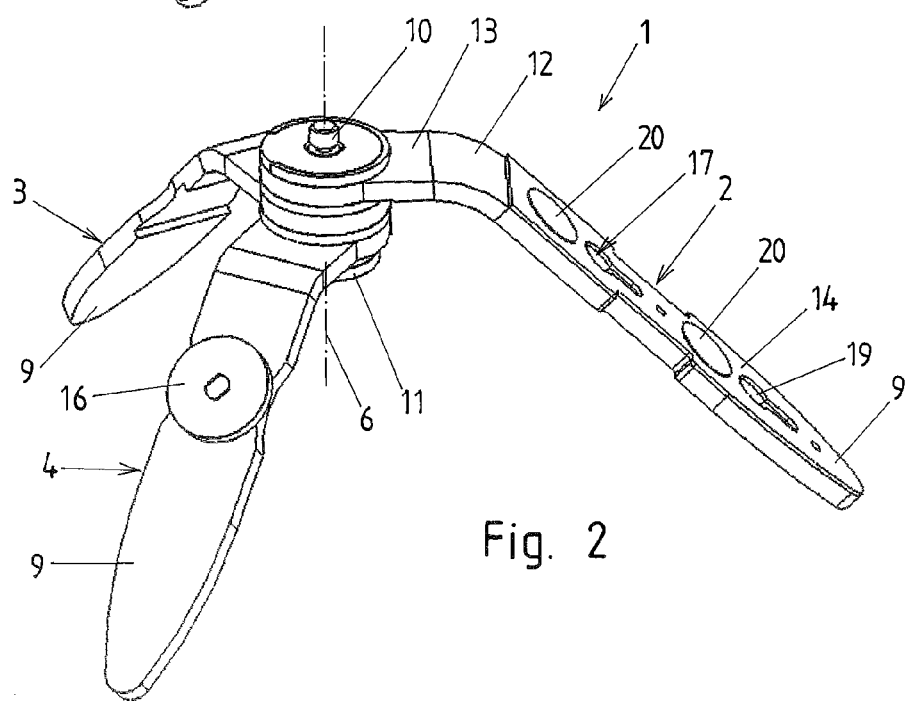
FIG. 2 is a perspective view of the stand according to the invention without any instrument placed on it.

The stand legs 2, 3, 4 have side edges 7, 8, which, at least in the proximity of the freely projecting support ends 9 of the legs 2, 3, 4, converge towards each other. Therefore, sufficient stability is given particularly when erecting it on the ground. When the stand legs 2, 3, 4 are pivoted out, as shown in FIG. 1 and FIG. 2, the instrument has a non-wobbling support on crude surfaces. For example, tilers can immediately determine the horizontal reference line for laying wall tiles and can mount the first row of tiles on the laser line. Providing a secure placement on uneven and rough surfaces is the primary application of small stands.

In order for an instrument 5 to be held safely on the stand 1, a threaded bolt 10 is provided, protruding beyond the uppermost stand leg 2 in the common axis 6 of the stand legs 2, 3, 4, which is effectively connected to an operational disc 11 arranged beneath the lowermost stand leg 4. This way, a screw connection is possible and thus a direct, fixed engagement in a threaded bore at the bottom of the instrument 5.

Figure 3:
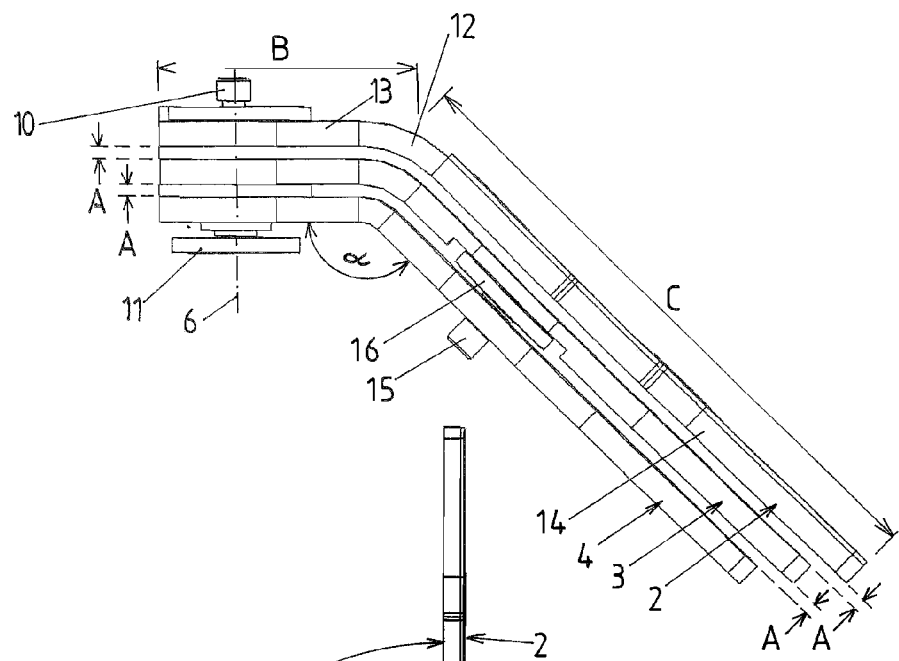
FIG. 3 is a side view with stand legs swiveled together to the resting position.
Figure 4:
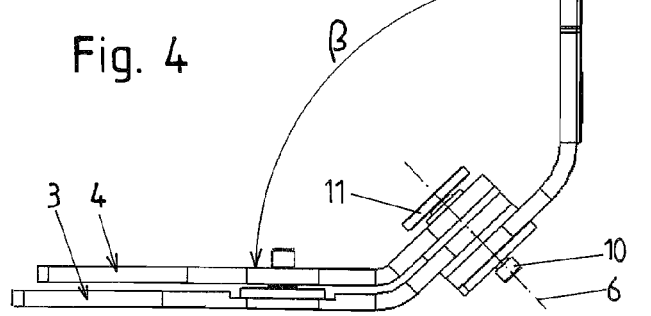
FIG. 4 is a side view of the stand legs in the alignment for a wall mount of the stand.
Figure 5:
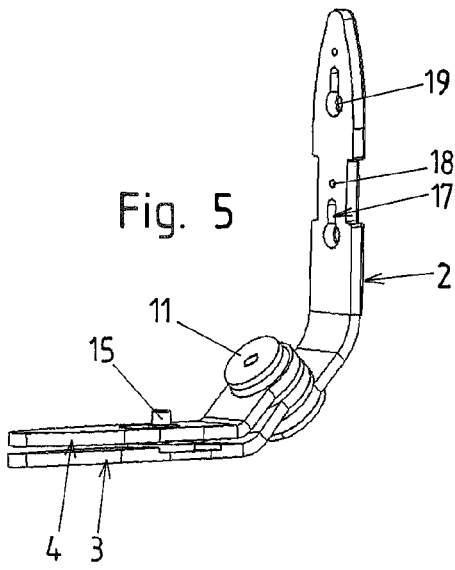
FIG. 5 is a similar view to FIG. 4, however, in a perspective view.
Figure 6:
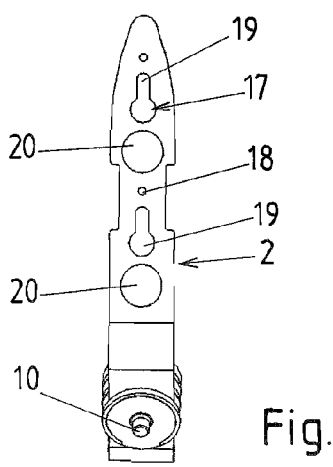
FIG. 6 is a view of the embodiment according to FIGS. 4 and 5 in the direction of the arrow VI in FIG. 4, seen from the back.

The stand legs 2, 3, 4 are arranged at a slight distance A from each other, at least in the proximity of the common axis 6. Here, it is advantageous for technical design reasons when the legs, in the swiveled pivoted together (see particularly FIG. 3), are arranged over their entire length at a slight distance A in reference to each other. This way, the stand legs 2, 3, 4 can be produced in a simple fashion from a flat material, and in spite thereof can still be pivoted around a common axis 6 without hindering each other. Without this spacing, such a stand could not be pivoted or the stand legs 2, 3, 4 had to be embodied in a warped manner according to the rotational radius.

The two sections 13, 14 of the stand legs 2, 3, 4 formed on each side of the bend 12 are embodied with different lengths each for all stand legs 2, 3, 4. For example, in the stand leg 2 the section 13 is embodied with a length B and the section 14 with a length C. The sections 13 and 14 are embodied increasingly shorter in the stand legs 3 and 4. The two sections 13 and 14 of the uppermost stand leg 2 formed on each side of the bend 12 are therefore the longest ones and the sections 13 and 14 of the lowermost stand legs 13 and 14 are embodied the shortest.

In general, the pivotal stand legs 2, 3, 4 can be bent at an almost arbitrary angle α towards the common axis 6. Only the support area would change correspondingly (small area=risk of tilting; large area=high stability). Due to the fact that the stand according to the invention can also allow the use in wall areas or on supports extending vertically, it is useful for the two sections 13, 14 of the stand legs 2, 3, 4 to form an angle α of 135° in reference to each other. This way, in case of a wall mount, the two sections 14 of the stand legs 2 and/or 3, 4, pivoted by 180° in reference to each other, form an angle β of 90°.

In order to allow the use of the stand 1 at walls or vertically extending supports and a respective fastening of an instrument 5, another threaded bolt 15 is provided at the lowermost leg 4 at the freely projecting section 14, freely protruding therefrom transversely, which can be pivoted via the operating disk 15 and thus, by operating it, said bolt can be screwed into a threaded bore at the bottom of the instrument 5.

In the exemplary embodiment shown, it is ensured that the stand 1 can be fastened in a simple manner at a wall or a respective support. For this purpose, at least one of the stand legs, preferably the uppermost leg 2, can be provided with recesses 17, slots, bores 18, or the like in the freely projecting section 14. Here, it may be provided that at least one of the stand legs, preferably the uppermost stand leg, is provided with keyhole-shaped recesses in the freely projecting section. Then, first two screws with heads can be screwed into a wall and subsequently the stand is inserted in the area of said keyhole-shaped recesses 19 of said one stand leg 2 and can be fastened by a vertical displacement.

Within the scope of the invention it is also possible that at least one of the stand legs 2, 3, 4, preferably the uppermost leg 2, carries at least one permanent magnet 20, preferably arranged counter-sunk into the surface of the stand leg, at the freely projecting section 14. This way, even without any attachment of additional fastening means, a good fastening of the stand 1 to metallic furniture or a metallic wall made from ferromagnetic material is possible. This also allows a fastening to an adapter 22, with for example at least the sections 21 being made from ferromagnetic material.

With an adapter 22, the stand 1 or at least one stand leg 2 can be used, for example, at a tubular support 23. This adapter 23 is provided at its back with a groove-like recess 24 in order to allow a securely positioned contact to the tubular support 23. Block-shaped adapters 26 (according to FIG. 9) are provided with a marginal V-notch 27 at their bottom. Thereabove, an oblong hole 28 is arranged extending perpendicularly through the block, through which a fastening tape is looped. This type of fastening is suitable for tubular supports 23 having diameters ranging from small to tiny.

The adapter 22 can be fixed at a tubular support 23 via a fastening tape or a tensile tape 25.

An adapter 22 has been provided for the stand 1 according to the invention, which can also be called a small stand, allowing the fastening to very small tubes up to tubes with large diameters. It is provided, on the one hand, with an angular range and/or a groove-like recess 24 that is large enough to provide a reliable centering effect. The adapter 22 is complemented by a fastening latch 29 for the stand that can be produced by a simple fold.

In the center, the adapter 22 a recess 30 is preferably provided for a fastening via a tensile tape 25. This simple measure has the same purpose as the oblong hole 28 in the block-type adapters 26. However, the fastening of the adapter 22 is simpler and can be executed without any looping.

Further, the use of a double-sided adhesive tape is also possible, which is adhered to the back of the respective stand leg 2 and with its other side to the wall surface, e.g., pressed to the surface of the tiles. This achieves high adhesive force and is independent from the material. This is primarily advantageous for heating, ventilation, and air conditioning technology, in which plastic, aluminum, copper, and primarily stainless steel is used.

Due to the use of threaded bolts 10 and 15, which are provided with a ¼" thread, any instrument or device can be optimally fastened. Additionally, commercial photo equipment can be screwed in, such as e.g., a ball joint, between the instrument 5 and the stand 1.

LEGEND OF THE REFERENCE CHARACTERS 1 stand
2 stand leg
3 stand leg
4 stand leg
5 instrument
6 axis
7 side edge
8 side edge
9 support end
10 threaded bolt
11 operating disk
12 bend
13 section
14 section
15 threaded bolt
16 operating disk
17 recesses
18 bores
19 recesses (keyhole-like)
20 permanent magnet
21 area
22 adapter
23 fastener
24 groove-like recess
25 tensile tape
26 block-shaped adapter
27 V-notch
28 Oblong hole
29 Fastening latch
30 Recess
A Distance
B Length of the section 13
C Length of the section 14

The invention claimed is:

1. A stand for fastening a leveling, plumbing, or angular calibration instrument in both a standing and one or more hanging configurations, comprising: at least three stand legs, with ends of the stand legs facing each other and being pivotal around a common axis and each of the stand legs being bent by a same angle at a distance from the axis, with the lowermost stand leg being provided with a freely protruding first threaded bolt at a freely projecting section, transverse in reference thereto, the freely protruding first threaded bolt being located so as to support the leveling plumbing, or angular calibration instrument when in the one or more hanging configurations, the stand further comprising a second threaded bolt protruding beyond an uppermost one of the stand legs along the common axis and being located so as to support the leveling, plumbing, or angular calibration instrument when in the standing configuration.

2. A stand according to claim 1, wherein the stand legs include side edges, which at least in proximity to freely projecting support ends of the stand legs converge towards each other.

3. A stand according to claim 1, the second bolt being in an effective connection to an operating disk arranged below a lowermost one of the stand legs.

4. A stand according to claim 1, wherein the stand legs, at least in proximity to the common axis, are arranged spaced apart at a distance in reference to each other.

5. A stand according to claim 4, wherein in a swiveled together state of the legs, the legs are arranged spaced apart by the distance in reference to each other over an entire length thereof.

6. A stand according to claim 1, wherein two sections of the stand legs are defined on each side of a bend, with the lengths of the sections being different for all of the stand legs.

7. A stand according to claim 6, wherein the two sections of an uppermost one of the stand legs defined on each side of the bend are embodied the longest and the sections of a lowermost one of the stand legs are embodied the shortest.

8. A stand according to claim 6, wherein the two sections of each of the stand legs form an angle of 135 degrees in reference to each other.

9. A stand according to claim 1, wherein an uppermost one of the stand legs or at least one of the other stand legs includes recesses, slots, or bores in a freely projecting section.

10. A stand according to claim 1, wherein an uppermost one of the stand legs or at least one of the other stand legs has at least one permanent magnet located at a freely projecting section.

11. A stand according to claim 10, wherein the permanent magnet is arranged counter-sunk into a surface of the stand leg.

12. A stand according to claim 9, wherein the uppermost stand leg or at least one of the other stand legs is provided at least one keyhole-shaped recess in the freely projecting section.

13. A stand according to claim 10, wherein the uppermost stand leg or at least one of the other stand legs is provided with at least one keyhole-shaped recess in the freely projecting section.

14. A stand according to claim 1, wherein the stand is provided with an adapter to be inserted between a tubular support and one of the stand legs, the adapter includes a groove-like recess for a securely positioned contact to the tubular support.

15. A stand according to claim 14, wherein the adapter is fastenable to a tubular support via a fastening tape or a tensile tape.

16. A stand according to claim 1, further comprising a double-sided adhesive tape connected thereto for connection of the stand leg to a level wall.

17. A stand according to claim 1, wherein the first threaded bolt is provided at the freely projecting section of a lowermost one of the legs for fastening the leveling, plumbing, and angular calibration instrument.

18. A stand according to claim 1, wherein each of the stand legs are bent by the same angle at a bend, with each of the stand legs having a section located between the common axis and the bend and on the side opposite said section of the bend, the freely projecting section extends.

19. A stand according to claim 1, wherein the leveling, plumbing, and angular calibration instrument comprises a linear laser, a point laser, or a small rotary laser device.

* * * * *